(12) United States Patent  
Miyazaki et al.

(10) Patent No.: US 8,754,937 B2
(45) Date of Patent: Jun. 17, 2014

(54) VIDEO SIGNAL PROCESSING APPARATUS AND IMAGE DISPLAY APPARATUS

(75) Inventors: Shinichiro Miyazaki, Kanagawa (JP); Yoshihide Nagatsu, Stuttgart (DE)

(73) Assignees: Sony Corporation, Tokyo (JP); Sony Deutschland GmbH, Cologne (DE)

( * ) Notice: Subject to any disclaimer, the term of this patent is extended or adjusted under 35 U.S.C. 154(b) by 1812 days.

(21) Appl. No.: 11/751,532

(22) Filed: May 21, 2007

(65) Prior Publication Data

US 2007/0296811 A1    Dec. 27, 2007

(30) Foreign Application Priority Data

May 22, 2006  (JP) ................................. 2006-141835

(51) Int. Cl.
*H04N 3/36* (2006.01)
*H04N 9/11* (2006.01)

(52) U.S. Cl.
USPC ................................. 348/97; 348/102; 725/20

(58) Field of Classification Search
USPC .......................................................... 348/97
See application file for complete search history.

(56) References Cited

U.S. PATENT DOCUMENTS

| | | | | |
|---|---|---|---|---|
| 4,249,209 A * | 2/1981 | Storey | | 348/620 |
| 4,581,641 A * | 4/1986 | Turner | | 348/607 |
| 4,630,120 A * | 12/1986 | Childs | | 348/106 |
| 4,641,188 A * | 2/1987 | Dischert | | 348/448 |
| 5,049,984 A * | 9/1991 | Moore et al. | | 348/104 |
| 5,200,824 A * | 4/1993 | Kageyama | | 348/607 |
| 5,892,550 A * | 4/1999 | Iwasaki et al. | | 348/443 |
| 6,002,451 A * | 12/1999 | Arikane et al. | | 348/735 |
| 6,195,132 B1 * | 2/2001 | Kimura et al. | | 348/618 |
| 6,408,024 B1 * | 6/2002 | Nagao et al. | | 375/240.01 |
| 6,864,913 B2 * | 3/2005 | Tarnoff et al. | | 348/97 |
| 6,965,414 B2 * | 11/2005 | Haraguchi | | 348/441 |
| 7,190,391 B2 * | 3/2007 | Brett | | 348/97 |
| 7,203,238 B2 * | 4/2007 | Liu et al. | | 375/240.17 |

(Continued)

FOREIGN PATENT DOCUMENTS

| | | |
|---|---|---|
| EP | 0720366 | 3/1996 |
| EP | 1503582 | 2/2005 |

(Continued)

OTHER PUBLICATIONS

English-language Abstract of Japanese Application Publication No. 2002-330311, published Nov. 15, 2002.

(Continued)

*Primary Examiner* — Backhean Tiv
(74) *Attorney, Agent, or Firm* — Finnegan, Henderson, Farabow, Garrett & Dunner, L.L.P.

(57) ABSTRACT

Disclosed is a video signal processing apparatus including a telecine conversion signal detecting unit configured to detect whether or not an input video signal in an interlaced system is a telecine converted video signal; an IP converting unit configure to convert the input video signal into a signal in a progressive system according to a detected result obtained by the telecine conversion signal detecting unit; and a noise level detecting unit configured to detect a noise level of the input video signal. The video signal processing apparatus further includes a control unit configured to control a detection sensitivity of the telecine conversion signal detecting unit such that the input video signal is detected as the telecine converted video signal less easily if a noise level is increased based on the detected result obtained from the noise level detecting unit.

9 Claims, 5 Drawing Sheets

(56) References Cited

U.S. PATENT DOCUMENTS

| | | | |
|---|---|---|---|
| 7,268,820 B2 * | 9/2007 | Honda et al. | 348/441 |
| 7,420,618 B2 * | 9/2008 | Swartz | 348/554 |
| 7,479,978 B2 * | 1/2009 | Cho et al. | 348/97 |
| 7,529,426 B2 * | 5/2009 | Neuman | 382/278 |
| 7,555,715 B2 * | 6/2009 | Randall et al. | 715/249 |
| 7,667,776 B2 * | 2/2010 | Li et al. | 348/607 |
| 8,248,537 B2 * | 8/2012 | Kimura et al. | 348/701 |
| 2003/0115590 A1 * | 6/2003 | Haraguchi | 725/20 |
| 2005/0157188 A1 * | 7/2005 | Kubo | 348/241 |
| 2005/0212972 A1 * | 9/2005 | Suzuki | 348/607 |
| 2005/0243198 A1 * | 11/2005 | Pardikes | 348/370 |
| 2006/0221241 A1 * | 10/2006 | Okumichi et al. | 348/571 |
| 2007/0296811 A1 * | 12/2007 | Miyazaki et al. | 348/97 |
| 2008/0151103 A1 * | 6/2008 | Asamura et al. | 348/448 |
| 2009/0184916 A1 * | 7/2009 | Miyazaki et al. | 345/102 |
| 2010/0013991 A1 * | 1/2010 | Miyazaki et al. | 348/452 |

FOREIGN PATENT DOCUMENTS

| | | |
|---|---|---|
| EP | 1592250 | 2/2005 |
| JP | 11-341444 | 12/1999 |
| JP | 2004-34333 | 12/2004 |
| JP | 3692963 | 7/2005 |

OTHER PUBLICATIONS

Extended European Search Report for Application No. EP 07252091.9, dated Jun. 8, 2012, (9 pages).

* cited by examiner

| SNLV | Level dBu | YNLV |
|---|---|---|
| 1 | 70 | 10 |
| 2 | 65 | 20 |
| 3 | 62 | 30 |
| 4 | 58 | 50 |
| 5 | 55 | 70 |
| 6 | 50 | 100 |
| 7 | 35 | 150 |

FIG. 5B

| SNLV | Level dBu | YNLV |
|---|---|---|
| 1 | 74 | 6 |
| 2 | 68 | 12 |
| 3 | 64 | 22 |
| 4 | 59 | 42 |
| 5 | 57 | 58 |
| 6 | 53 | 84 |
| 7 | 44 | 120 |

FIG. 6

| Mode | Function |
|---|---|
| 1 | Film Detection "Off" |
| 2 | Pulldown Reverse "On", Film Detection 2 |
| 3 | Pulldown Reverse & Frame Conversion "On", Film Detection 2 |
| 4 | Pulldown Reverse & Frame Conversion "On", Film Detection 1 |

FIG. 7

| User Selection Mode | | | | |
|---|---|---|---|---|
| 1 | Mode1 | Mode1 | Mode1 | Mode1 |
| 2 | Mode2 | Mode2 | Mode2 | Mode1 |
| 3 | Mode3 | Mode2 | Mode2 | Mode1 |
| 4 | Mode4 | Mode2 | Mode2 | Mode1 |
| SNLV | 0/1 | 2/3 | 4/5 | 6/7 |

VIDEO SIGNAL PROCESSING APPARATUS AND IMAGE DISPLAY APPARATUS

CROSS REFERENCES TO RELATED APPLICATIONS

The present invention contains subject manner related to Japanese Patent Application JP 2006-141835 filed in the Japanese Patent Office on May 22, 2006, the entire contents of which being incorporated herein by reference.

BACKGROUND OF THE INVENTION

1. Field of the Invention

The present invention relates to a video signal processing apparatus which performs a progressive conversion processing, or the like on a video signal in an interlaced system obtained from a source of a cinema film, and to an image display apparatus that installed such video signal processing apparatus.

2. Description of the Related Art

Units that are configured to detect whether a source of a video signal is a cinefilm or a video camera, and that have an IP conversion processing suitable for the source and a higher image quality display, are used in an IP converting portion that converts a video signal of an interlaced system (interlace format) to a progressive video signal (a video signal of a progressive format) in a television receiving apparatus or the like. Furthermore, recently, in case of a video signal with which a cinefilm becomes a source (hereinafter, also called a film signal), a smoother movement of an image is realized by implementing a frame rate conversion processing by motion compensation after the IP conversion processing, (for example, see Patent Document 1: Japanese Unexamined Patent Publication No. 2004-34333).

Figure 1:
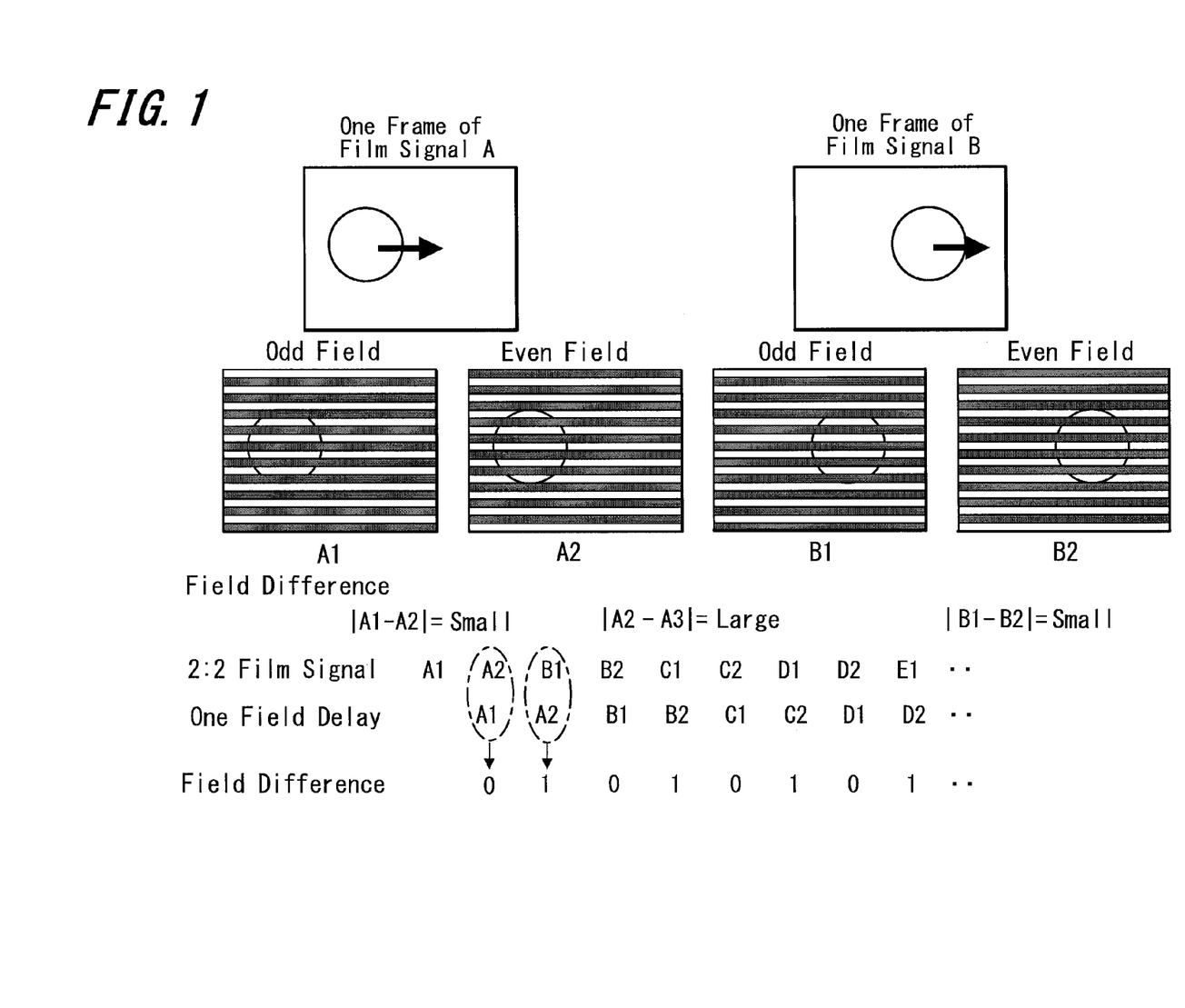
FIG. 1 is a diagram showing a processing for detecting a film signal.
Figure 2:
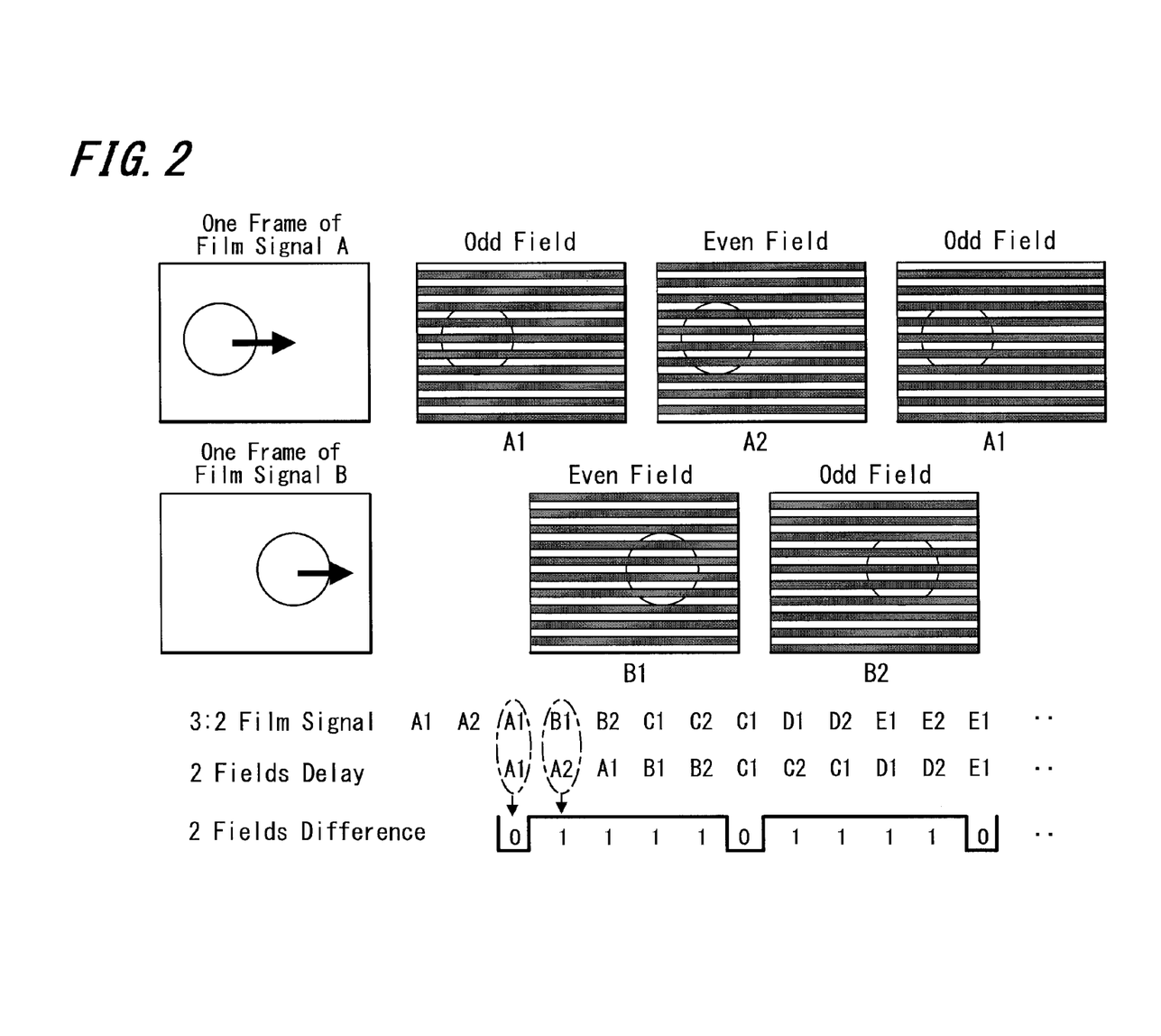
FIG. 2 is a diagram showing a processing for detecting a film signal.

FIGS. 1 and 2 show a processing for detecting a film signal. Among these, FIG. 1 shows a processing for detecting a 2:2 film signal to which a 2:2 pulldown processing (conversion to a PAL signal (576i) of 50 Hz) was implemented. In the 2:2 film signal, two fields are formed from the same frame by separating one frame of film into odd field and even field. Then, if a difference of each field between the signal and the one field delayed signal is taken, a difference between the same frames and a difference between the different frames are calculated alternately, so the difference changes alternately as 0, 1, 0, 1 . . . , in case of motion picture, and consequently that it is the 2:2 film signal is detected.

FIG. 2 shows a processing for detecting a 3:2 film signal to which a 3:2 pulldown processing (conversion to a NTSC signal (480i) of 60 Hz) was implemented. In the 3:2 film signal, three fields are formed from the frame of the same film and subsequently, two fields are formed from the frame of the same film, and then these states are continued alternately. Then, if a difference between the signal and the two field delayed signal is taken, a difference between the same fields is calculated at every five fields and the difference becomes 0, and consequently that it is the 3:2 film signal is detected.

Figures 3A, 3B, 3C:
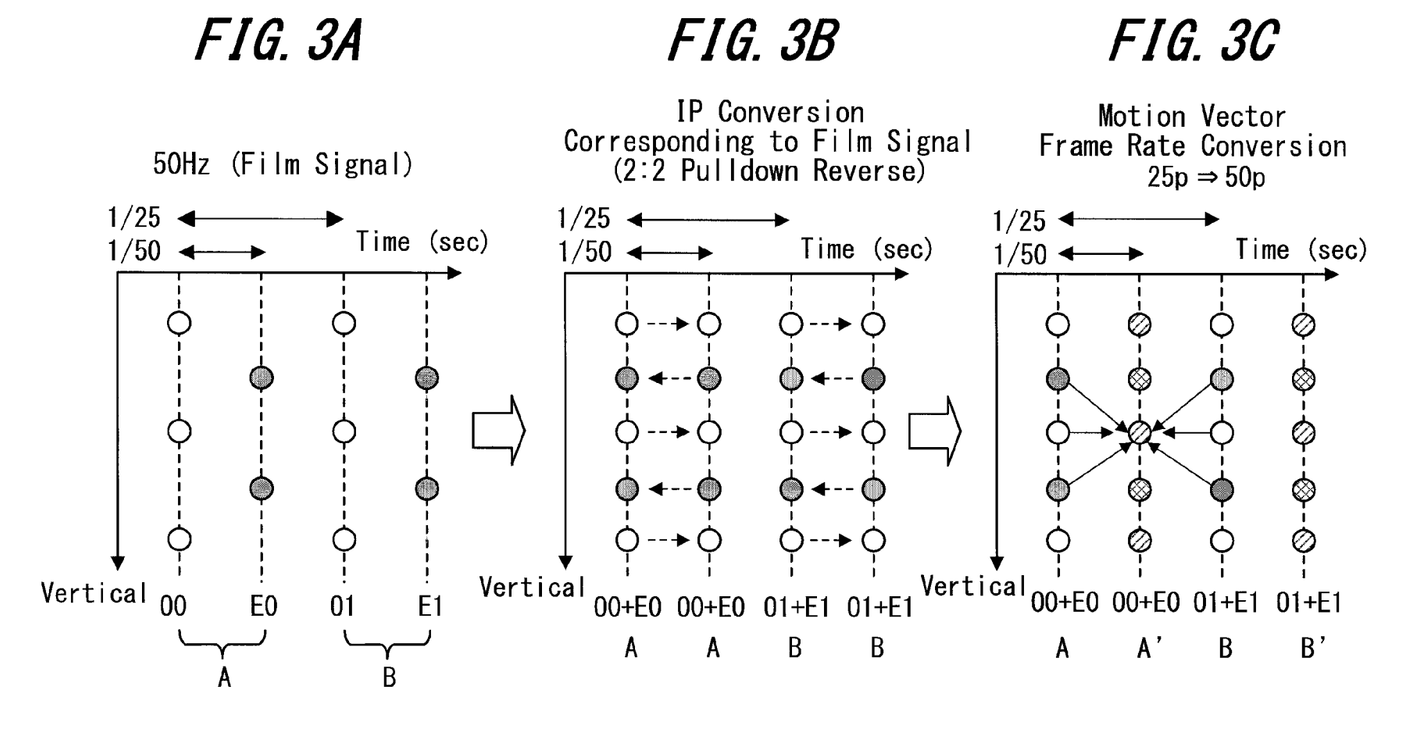
FIGS. 3A to 3C are diagrams showing frame rate conversion processing by motion compensation.

FIGS. 3A to 3C show a frame rate conversion processing by motion compensation as an example of the 2:2 film signal. After the 2:2 film signal (PAL signal (576i) of 50 Hz) as shown in FIG. 3A is converted a progressive signal of 25 Hz by an IP conversion processing (2:2 pulldown reverse processing) by which the odd field and even field as shown in FIG. 3B are added, a motion vector is detected at interval of one field, as shown in FIG. 3C, and the intermediate field is interpolated by the motion compensation, thereby converting the frame rate from 25 Hz to 50 Hz. The motion of the image that is displayed becomes smooth by the frame rate conversion.

SUMMARY OF THE INVENTION

However, in a case in which the film signal detection processing as shown in FIGS. 1 and 2 are implemented in the condition where a S/N ratio becomes bad by weakening a field strength of RF signal transmitted to a television receiving apparatus from a receiving antenna, for example, a difference is caused due to the influence of random noise, even in the field where it should become a zero because it is produced from the originally same frame when the difference is taken, and consequently a malfunction to detection is sometimes caused. In a case in which such malfunction occurs, the condition in which the IP conversion processing for film signal and the IP conversion processing for usual camera-signal (video signal obtained from a source using a video camera) are frequently switched is caused though it is the film signal because a detected result of the film signal becomes instability, and consequently a problem that it becomes difficult to watch the image is caused.

Also, in a case in which the detected result of the film becomes instability like this, the condition in which the frame rate conversion processing shown in FIG. 3C is frequently switched to "ON" and "OFF" is caused, and consequently the image becomes more unsightly. Furthermore, in a case in which the noise level increases, the malfunction occurs in the motion vector itself and the accurate vector detection may not be done, thereby causing such problem that the image breakdown is caused on a picture screen.

An embodiment of the present invention is thus directed to recover degradation of the picture quality by the influence of noise in the video signal in a case in which there are implemented a progressive conversion processing and frame rate conversion processing to the signal converted to take a matching with the frame rate of the television video signal (called [telecine conversion] in either case in which an original image is an animation or computer graphic in the present description) by arranging an original image such as a 2:2 film signal, a 2:3 film signal or the like, on the basis of a predetermined sequence.

A video signal processing apparatus according to an embodiment of the present invention includes a telecine conversion signal detecting unit, an IP converting unit, a noise level detecting unit and a control unit. Therein, the telecine conversion signal detecting unit detects whether or not an input video signal of interlaced system is a telecine converted video signal, and the IP converting unit converts the input video signal to a signal of progressive system, in accordance with a detected result of the telecine conversion signal detecting unit. Further, the noise level detecting unit detects a noise level of the input video signal, and the control unit controls a detection sensitivity of the telecine conversion signal detecting unit to make difficult to detect that the input video signal is the telecine converted video signal in case of a higher noise level than a low noise level, on the basis of the detected result of the noise level detecting unit.

The video signal processing apparatus implements a progressive conversion processing to an input video signal corresponding to a detected result of whether or not an input video signal is a telecine converted video signal, but a detection sensitivity of the telecine conversion signal detecting unit is controlled to make difficult to detect the input video signal being the telecine converted video signal, in a case in which a noise level of the input video signal is detected and the noise level is high.

Consequently, the progressive conversion processing for the telecine converted video signal becomes difficult to be carried out in the IP conversion unit, in a case in which a noise level of input video signal is high. Thus, in a case in which the noise level of input video signal is high, the degradation of picture quality caused by switching the progressive conversion processing for telecine converted video signal and the progressive conversion processing for usual camera-signal frequently, as a cause of the malfunction of detection of the telecine converted video signal, is improved.

Next, a video signal processing apparatus according to an embodiment of the present invention includes a telecine conversion signal detecting unit, an IP converting unit, a frame rate converting unit, a noise level detecting unit and a control unit. Therein, the telecine conversion signal detecting unit detects whether or not an input video signal of interlaced system is a telecine converted video signal, and the IP converting unit converts the input video signal to a signal of progressive system in accordance with a detected result of the telecine conversion signal detecting unit. Further, the frame rate converting unit converts a frame rate of the video signal converted to the signal of progressive system by the IP converting unit, in a case in which the video signal is detected to be a telecine converted video signal by said telecine conversion signal detecting unit, and the noise level detecting unit detects a noise level of the input video signal. Further, the control unit turns a frame rate conversion processing of the frame rate converting unit on in a case in which the noise level is small, and turns the frame rate conversion processing of the frame rate converting unit off in a case in which the noise level is high, on the basis of the detected result of the noise level detecting unit.

The video signal processing apparatus implements a progressive conversion processing corresponding to a detected result of whether an input video signal is a telecine converted video signal to an input video signal, and further a frame conversion processing is implemented to the telecine converted video signal after the progressive conversion processing, but the frame rate conversion processing is turned off, in a case in which a noise level of the input video signal is detected and the noise level is high.

Thus, in a case in which the noise level is high, the degradation of picture quality caused by switching the frame rate conversion processing on and off frequently, as a cause of the malfunction of detection of the telecine converted video signal, is improved, and also the image breakdown on a picture screen due to the malfunction of the motion vector detection is prevented.

Next, another video signal processing apparatus according to an embodiment of the present invention includes a telecine conversion signal detecting unit, an IP converting unit, a noise level detecting unit and a control unit. Therein, the telecine conversion signal detecting unit detects whether or not an input video signal of interlaced system is a telecine converted video signal and the IP converting unit converts the input video signal to a signal of progressive system in accordance with a detected result of the telecine conversion signal detecting unit. Further, the noise level detecting unit detects a noise level of the input video signal, and the control unit turns a detection processing of the telecine conversion signal detecting unit off in a case in which the noise level is more than a predetermined level, on the basis of the detected result of the noise level detecting unit.

The video signal processing apparatus implements a progressive conversion processing corresponding to a detected result of whether an input video signal is a telecine converted video signal to an input video signal, but a detection processing of the telecine conversion signal detecting unit is turned off, in a case in which a noise level of the input video signal is detected and the noise level is high.

Consequently, in a case in which the noise level is high, the progressive conversion processing for telecine converted video signal is not carried out in the IP conversion unit. Thus, in a case in which the noise level of input video signal is high, the degradation of picture quality caused by switching the progressive conversion processing for telecine converted video signal and the progressive conversion processing for usual camera-signal frequently, as a cause of the malfunction of detection of the telecine converted video signal, is improved.

Next, an image display apparatus according to an embodiment of the present invention has: a telecine conversion signal detecting unit which detects whether or not an input video signal of interlaced system is a telecine converted video signal; and an IP converting unit which converts the input video signal to a signal of progressive system in accordance with a detected result of the telecine conversion signal detecting unit, and displays the video signal converted to the signal of progressive system by said IP converting unit. Therein, the image display apparatus includes: a noise level detecting unit which detects a noise level of the input video signal; and a control unit which controls a detection sensitivity of the telecine conversion signal detecting unit to make difficult to detect it being the telecine converted video signal in case of a higher noise level than a low noise level, on the basis of the detected result of the noise level detecting unit.

Also, another image display apparatus according to an embodiment of the present invention has a telecine conversion signal detecting unit, an IP converting unit and a frame rate converting unit, and displays a frame rate converted video signal by the frame rate conversion unit. Therein, the telecine conversion signal detecting unit detects whether or not an input video signal of interlaced system is a telecine converted video signal and the IP converting unit converts said input video signal to a signal of progressive system in accordance with a detected result of the telecine conversion signal detecting unit. Further, the frame rate converting unit converts a frame rate of the video signal converted to the signal of progressive system by the IP converting unit, in a case in which the video signal is detected to be a telecine converted video signal by said telecine conversion signal detecting unit. Therein, the image display apparatus includes: a noise level detecting unit which detects a noise level of the input video signal; and a control unit which turns a frame rate conversion processing of the frame rate converting unit on in a case in which the noise level is small, and turns the frame rate conversion processing of the frame rate converting unit off in a case in which the noise level is high, on the basis of the detected result of the noise level detecting unit.

Also, still another image display apparatus according to an embodiment of the present invention has: a telecine conversion signal detecting unit which detects whether or not an input video signal of interlaced system is a telecine converted video signal; and an IP converting unit which converts the input video signal to a signal of progressive system in accordance with a detected result of the telecine conversion signal detecting unit, and displays the video signal converted to the signal of progressive system by said IP converting unit. Therein, the image display apparatus includes: a noise level detecting unit which detects a noise level of said input video signal; and a control unit which turns a detection processing of said telecine conversion signal detecting unit off in a case in which the noise level is more than a predetermined level, on the basis of the detected result of the noise level detecting unit.

These image display apparatuses are to include the aforementioned video signal processing apparatus according to an embodiment of the present invention respectively and to implement the progressive conversion processing (or the progressive conversion processing and frame rate conversion processing) to the telecine converted processing and to display it. In a case in which the noise level of input video signal is high, the degradation of picture quality caused by switching the frame rate conversion processing for telecine converted video signal and the frame rate conversion processing for usual camera-signal frequently, as a cause of the malfunction of detection of the telecine converted video signal, is improved. Alternatively, the degradation of picture quality caused by switching the frame rate conversion processing on and off frequently, as a cause of the malfunction of detection of the telecine converted video signal, is improved, and also the image breakdown on a picture screen due to the malfunction of the motion vector detection is prevented.

According to an embodiment of the present invention, in a case in which the video signal processing apparatus implements a progressive conversion processing corresponding to a detected result of whether an input video signal is a telecine converted video signal to an input video signal, the effect that the degradation of picture quality caused by switching the frame rate conversion processing on and off frequently, as a cause of the malfunction of detection of the telecine converted video signal, may be improved, is obtained, in a case in which the noise level of the input video signal is high.

Also, according to an embodiment of the present invention, in a case in which the progressive conversion processing corresponding to a detected result of whether an input video signal is a telecine converted video signal to an input video signal is implemented and further the frame rate conversion processing is implemented to the telecine converted video signal after the progressive conversion processing, the degradation of picture quality caused by switching the frame rate conversion processing on and off frequently, as a cause of the malfunction of detection of the telecine converted video signal, may be improved in a case in which the noise level of the input video signal is high.

DESCRIPTION OF THE PREFERRED EMBODIMENTS

Figure 4:
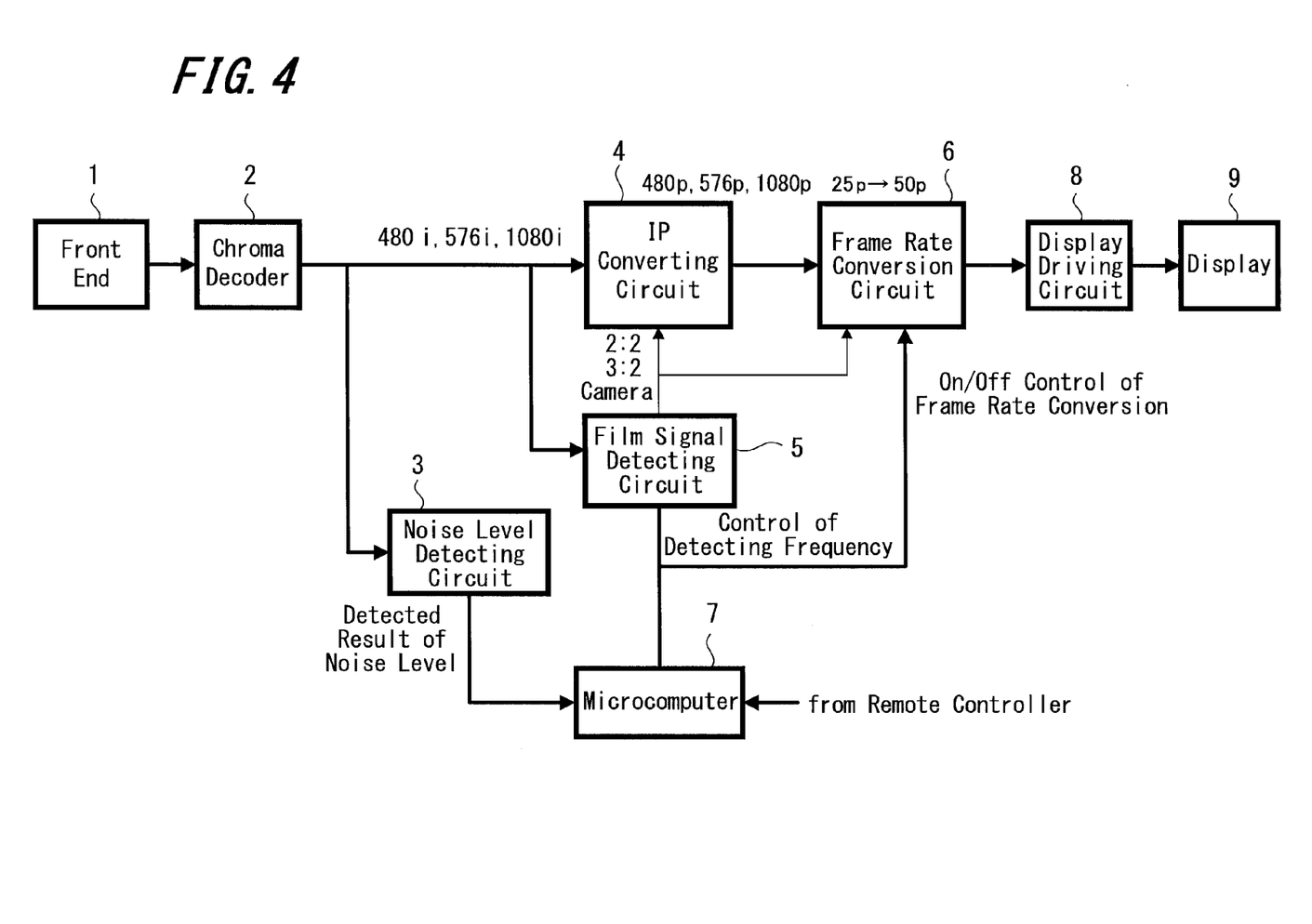
FIG. 4 is a block diagram showing a configuration of a television receiving apparatus to which an embodiment of the present invention is applied.

It is explained concretely about an embodiment where the present invention is applied to a television receiving apparatus, by using drawings, hereinafter. FIG. 4 is a block diagram showing a configuration of main portion of the television receiving apparatus to which an embodiment of the present invention is applied. On the basis of a RF signal that is transmitted to a frontend 1 from an antenna (not shown), it is selected at the frontend 1 and is demodulated, and a video signal in an interlaced system (interlace format) to which a Y/C separation processing and chroma decoding processing are implemented by a chroma decoder (NTSC signal (480i), PAL signal (576i) or HDTV signal (1080i)) is transmitted to a noise level detecting circuit 3, an IP converting circuit 4 and a film signal detecting circuit 5, respectively.

The film signal detecting circuit 5 is a circuit that detects whether or not an input video signal is a 2:2 film signal or a 2:3 film signal by the method shown in FIGS. 1 and 2. A signal showing a detected result (a signal showing which one of a 2:2 film signal, 2:3 film signal and usual camera-signal the input video signal is) is transmitted to the IP converting circuit 4 and frame rate conversion circuit 6 from the film signal detecting circuit 5.

The IP converting circuit 4 is a circuit that implements an IP conversion processing by which the input video signal of interlaced system is converted to a signal of progressive system (called progressive-conversion, hereinafter), and the IP conversion processing for film signal (for example, such pull-down reverse processing shown in FIG. 6, for the 2:2 film signal) is implemented if the detected result of the film signal detecting circuit 5 is the 2:2 film signal or 3:2 film signal, on the other hand, the IP conversion processing for usual camera-signal is implemented if the detected result of the film signal detecting circuit 5 is the usual camera-signal. The video signal (NTSC signal (480i), PAL signal (576i) or HDTV signal (1080i)) progressive-converted at the IP converting circuit 4 is transmitted to the frame rate conversion circuit 6.

The frame rate conversion circuit 6 is a circuit that implements the frame conversion processing from 25 Hz to 50 Hz (for example, such processing shown in FIG. 6, for the 2:2 film signal) by implementing a motion compensation of interpolation frame to the progressive converted video signal by the IP converting circuit 4, in a case in which the detected result of the film signal detecting circuit 5 is the 2:2 film signal or the 3:2 film signal. The frame rate conversion is not implemented in the frame rate converting circuit 6 if the detected result of the film signal detecting circuit 5 is the usual camera-signal.

The video signal outputted from the frame rate converting circuit 6 is transmitted to a display driving circuit 8 and a display (for example, LCD) 9 is driven by the display driving circuit 8 and an image is displayed.

The noise level detecting circuit 3 is a circuit that detects a noise level of the input video signal. The noise level detecting circuit 3 detects noise information (AC component) on a pedestal portion of one horizontal line in equalization pulse interval inside a vertical blanking interval of the input video signal, for example, and a voltage obtained from the AC component that is filtered by a filter with about 160 Hz cutoff frequency is detected as a noise value YNLV. Then, noise levels (SNLV0 to SNLV7) that change to eight levels by this noise value YNLV is detected (NLV0 indicates the noise level in the smallest level, Whereas NLV7 indicates the noise level in the largest level).

Figure 5A:
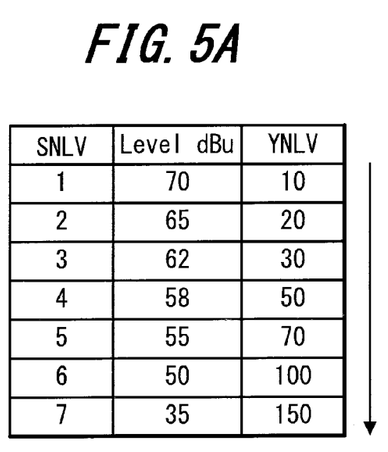
FIGS. 5A and 5B are a diagram that illustrates a detected result of noise level.
Figure 5B:
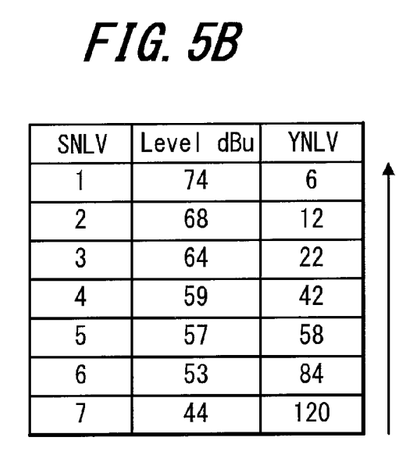

FIGS. 5A and 5B are a diagram that illustrates the detected results of the noise levels (SNLV0 to SNLV7), and FIG. 5A is the detected results at the time of increasing the noise level by decreasing the field strength of RF signal (level_dBu) from the receiving antenna. Conversely, FIG. 5B is the detected results at the time of decreasing the noise level by increasing the field strength of RF signal (level_dBu) from the receiving antenna.

As shown in FIG. 5A, the noise level SNLV is changed to 1 (before, the noise level SNLV is 0) if the noise value YNLV becomes equal to or more than 10 (field strength (level_dBu) is equal to or less than 70 dBu) at the time of decreasing the field strength (level_dBu). The noise level SNLV is changed to 2 if the noise value YNLV becomes equal to or more than 20 (field strength (level_dBu) is equal to or less than 65 dBu). The noise level SNLV is changed to 3 if the noise value YNLV becomes equal to or more than 30 (field strength (level_dBu) is equal to or less than 62 dBu). The noise level SNLV is changed to 4 if the noise value YNLV becomes equal to or more than 50 (field strength (level_dBu) is equal to or less than 58 dBu). The noise level SNLV is changed to 5 if the noise value YNLV becomes equal to or more than 70 (field strength (level_dBu) is equal to or less than 55 dBu). The noise level SNLV is changed to 6 if the noise value YNLV becomes equal to or more than 100 (field strength (level_dBu) is equal to or less than 50 dBu). The noise level SNLV is changed to 7 if the noise value YNLV becomes equal to or more than 150 (field strength (level_dBu) is equal to or less than 35 dBu).

On the other hand, the noise level SNLV is not changed to 6 from 7 even if the noise value YNLV becomes less than 150 (field strength (level_dBu) is more than 35 dBu), and is changed to 6 from 7 if the noise value YNLV begins to become less than 120 (field strength (level_dBu) is equal to or more than 44 dBu) being smaller than 150, at the time of increasing the field strength (level_dBu), as shown in FIG. 5B. Also, the noise level SNLV is not changed to 5 from 6 even if the noise value YNLV becomes less than 100 (field strength (level_dBu) is more than 50 dBu), and is changed to 5 from 6 if the noise value YNLV begins to become less than 100 (field strength (level_dBu) is equal to or more than 53 dBu) being smaller than 100. Similarly, the noise values YNLV that change the noise level SNLV to 4, 3, 2, 1 and 0 are set up lower than ones at the time of decreasing the field strength (level_dBu).

In this manner, the noise level detected by the noise level detecting circuit 3 has a hysteresis characteristic such that the increase of the field strength of RF signal from the antenna (decrease of the noise value) is more difficult to recover to suitable level than the decrease of the field strength of RF signal (increase of the noise value).

As shown in FIG. 4, a detected result of the noise level is transmitted to a microcomputer 7 from the noise level detecting circuit 3. Here, in FIG. 4, the noise level detecting circuit 3 is provided other than the chroma decoder 2, but the noise level detecting circuit 3 may be included in the chroma decoder 2.

Figure 6:
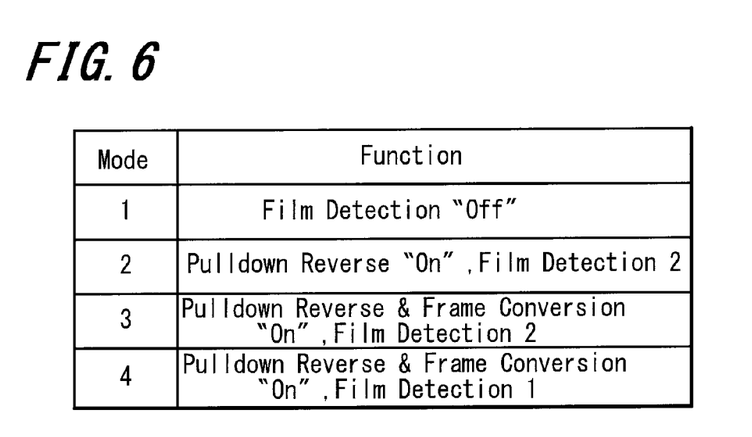
FIG. 6 is a diagram showing selectable modes by a remote controller.

Although a drawing is omitted, an operational portion by which a user combines the modes of the film signal detection processing, IP conversion processing and frame rate conversion processing and selects is provided to a remote controller of the television receiving apparatus. FIG. 6 shows an example of combination of selectable modes by the remote control. The remote controller is possible to select four kinds of modes from mode 1 to mode 4.

The mode 1 is a mode that turns the detection processing of the film signal off. By the mode 1, the detected result that indicates that the input video signal is the camera-signal is transmitted to the IP conversion circuit 4 and frame rate converting circuit 6 from the film signal detecting circuit 5. Therefore, the IP conversion processing for film signal (pulldown reverse processing) is not implemented in the IP converting circuit 4 and the IP conversion processing for usual camera-signal is typically implemented and the frame rate conversion processing is not implemented in the frame rate converting circuit 6.

The mode 2 is a mode which sets up parameters that control a detection sensitivity of the film signal detecting circuit 5 to "film detection 2" and which turns the IP conversion processing for film signal (pulldown reverse processing) of the IP converting circuit 4 on and which turns the frame rate conversion processing of the frame rate converting circuit 6 off. By the mode 2, if the film signal is detected by the film signal detecting circuit 5, the IP conversion processing for film signal is implemented in the IP converting circuit 4, but the frame rate conversion processing is not implemented in the frame rate conversion circuit 6.

Here, it is explained about parameters that control the detection sensitivity of the film signal detecting circuit 5. As for the detection of the film signal (specifically, 2:2 film signal), the detection is stably possible in the scenes with an intense motion or the like because a characteristic of the field difference shown in FIG. 1 is detected remarkably, but it is difficult to detect the characteristic of the field difference in the scenes with a little motion or the like. Therefore, it is difficult to perform the film detection in all scenes without the malfunction. Then, there are parameters that control the detection sensitivity of the film signal. Here, it is determined which one of two kinds of parameters "film detection 1", "film detection 2" is set up to the film signal detecting circuit 5, in accordance with the modes in FIG. 6.

"Film detection 1": it is a parameter by which the film signal detection becomes easy and by which the film signal detection becomes difficult after detecting the film signal once (detection sensitivity is increased). The following examples are cited for embodiments of such parameter:

A parameter that sets up a threshold level for determining whether the difference is 0 or 1 in a case in which the difference of each field is taken, as shown in FIG. 1 or FIG. 2, to the level so that the difference changes alternately as 0, 1, 0, 1 . . . , as shown in FIG. 1, or becomes 0 easily for every five fields as shown in FIG. 2.

A parameter that reduces a counting value (number of times): it is determined whether or not it is the 2:2 film signal by the number of times with which 0 and 1 are alternately repeated, or it is determined whether or not it is the 3:2 film signal by the number of times with which it becomes 0 for each five fields.

"Film detection 2": it is a reverse for "Film detection 2", and it is a parameter by which the film signal detection becomes easy and by which the detection of being not the film signal becomes easy after detecting the film signal once (detection sensitivity is decreased).

Therefore, in FIG. 6, because the parameter is set up to "film detection 2" in the mode 2, the detection sensitivity of the film signal detecting circuit becomes weak, therefore it becomes difficult to implement the IP conversion processing for film signal in the IP converting circuit 4.

The mode 3 is a mode by which the parameter that controls the detection sensitivity of the film signal detecting circuit 5 is set up to "film detection 2" and by which the IP conversion processing for film signal of the IP converting circuit 4 (pulldown reverse processing) is turned on and by which the frame rate conversion processing of the frame rate converting circuit 6 is also turned on. In the mode 3, if the film signal is detected in the film signal detecting circuit 5, the IP conversion processing for film signal is implemented in the IP converting circuit 4 and also the frame rate conversion processing is implemented in the frame rate converting circuit 6. However, because the detection sensitivity of the film signal detecting circuit 5 becomes weak, it becomes difficult to implement the IP conversion processing for film signal in the IP converting circuit 4 and it becomes difficult to implement the frame rate conversion processing in the frame rate converting circuit 6, too.

The mode 4 is a mode by which the parameter that controls the detection sensitivity of the film signal detecting circuit 5 is set up to "film detection 1" and by which the IP conversion processing for film signal of the IP converting circuit 4 (pulldown reverse processing) is turned on and by which the frame rate conversion processing of the frame rate converting circuit 6 is also turned on. In the mode 4, if the film signal is detected in the film signal detecting circuit 5, the IP conversion processing for film signal is implemented in the IP converting circuit 4 and also the frame rate conversion processing is implemented in the frame rate converting circuit 6. Then, because the detection sensitivity of the film signal detecting circuit 5 becomes strong, it becomes easy to implement the IP conversion processing for film signal in the IP converting circuit 4 and it becomes easy to implement the frame rate conversion processing in the frame rate converting circuit 6, too.

As shown in FIG. 4, the signal that indicates the selected result of the modes 1 to 4 is supplied to the microcomputer 7 from the remote controller through an infrared receiving sensor unit or the like that is not shown.

Figure 7:
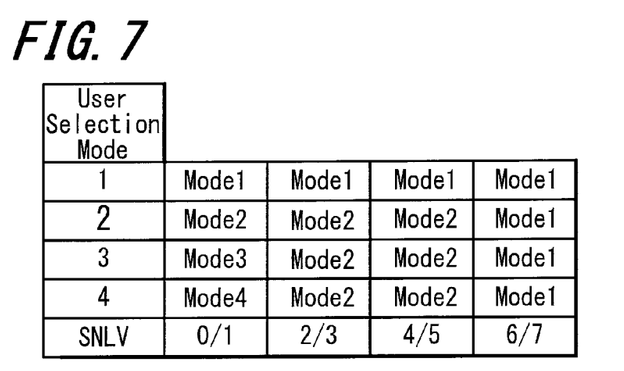
FIG. 7 is a diagram showing a mode change processing by a microcomputer.

The microcomputer 7 changes the mode dynamically and controls the IP converting circuit 4, film signal detecting circuit 5 and frame rate converting circuit 6, as shown in FIG. 7, on the basis of the selected result of the modes 1 to 4 by the user and the selected result of the noise levels SNLV0 to SNLV7 by the noise level detecting circuit 3. Specifically, in a case in which the noise level is SNLV0 or SNLV1 (level where the field strength of RF signal is strong and the noise level is small), the control of the IP converting circuit 4, the control of the detection sensitivity of the film signal detecting circuit 5 (the change of the parameter or the detection processing turning off) and the ON/OFF control of the frame rate conversion processing of the frame rate converting circuit 6 are implemented in accordance with the modes 1 to 4 selected by the user. It should be noted that a drawing of the control signal wires to the IP converting circuit 4 is omitted in the figure (as the same as the modes 2 to 4 even in case of the mode 1, because the film signal is not detected even if the pulldown reverse processing of the IP converting circuit 4 is turning on, the IP conversion processing for film signal is not implemented).

In a case in which the noise level is SNLV2, SNLV3, SNLV4 or SNLV5 (level where the field strength of RF signal is middle range and the noise level is middle range), the control of the IP converting circuit 4, the control of the detection sensitivity of the film signal detecting circuit 5 and the ON/OFF control of the frame rate conversion processing of the frame rate converting circuit 6 are implemented in accordance with the mode in a case in which the user selects the modes 1 or 2. However, the control of the IP converting circuit 4, the control of the detection sensitivity of the film signal detecting circuit 5 and the ON/OFF control of the frame rate conversion processing of the frame rate converting circuit 6 are implemented forcibly by the mode 2, in a case in which the user selects the modes 3 or 4. Therefore, in this case, the frame rate conversion processing is not implemented in the frame rate converting circuit 6 and also the detection sensitivity of the film signal becomes weak, so it becomes difficult to implement the IP conversion processing for film signal in the IP converting circuit 4, too.

In a case in which the noise level is SNLV6 or SNLV7 (level where the field strength of RF signal is weak and the noise level is high), the control of the IP converting circuit 4, the control of the detection sensitivity of the film signal detecting circuit 5 and the ON/OFF control of the frame rate conversion processing of the frame rate converting circuit 6 are implemented forcibly by the mode 1, in a case in which the user selects any one of the modes 1 to 4. Therefore, the IP conversion processing for film signal is not implemented in the IP converting circuit 4 and the IP conversion processing for camera-signal is typically implemented and the frame rate conversion processing is not implemented in the frame rate conversion circuit 6.

As mentioned above, the detection sensitivity of the film signal detecting circuit 5 is controlled to make difficult to detect that the input signal is the telecine converted video signal in case of a higher (bigger) noise level than a low (small) noise level, on the basis of the detected result of the noise level detecting circuit 5.

Moreover, the microcomputer 7 controls to turn on the frame rate conversion processing of the frame rate conversion circuit 6 if the noise level is lower than a predetermined value, and to turn off the frame rate conversion processing of the frame rate conversion circuit 6 if the noise level is equal to or higher than the predetermined value based on the detected result of the noise level detecting circuit 3 in each mode.

The effects such as the followings (1) to (3) are obtained by implementing such dynamic mode change.

(1) In the level where the field strength of RF signal is a weak or a middle range, because the frame rate conversion processing is not implemented by the motion compensation in the frame rate converting circuit 6, the degradation of picture quality caused by switching the frame rate conversion processing on and off frequently, as a cause of the malfunction of the film signal detection, is improved and also the image breakdown on a picture screen due to the malfunction of the motion vector detection is prevented.

(2) In the level where the field strength of RF signal is a middle range, because it becomes difficult to detect the film signal, it become difficult to implement the IP conversion processing in the IP converting circuit 4. Thus, the degradation of picture quality caused by switching the IP conversion processing for film signal and the IP conversion processing for usual camera-signal frequently, as a cause of the malfunction of the film signal detection, is improved.

(3) In the level where the field strength of RF signal is a weak range, because the detection processing of the film signal is not implemented, the IP conversion processing for film signal is not implemented in the IP converting circuit 4 and the IP conversion processing for usual camera-signal is typically implemented. Thus, the degradation of picture quality caused by switching the IP conversion processing for film signal and the IP conversion processing for usual camera-signal frequently, as a cause of the malfunction of the film signal detection, is improved.

It should be noted as shown in FIGS. 5A and 5B that the noise levels SNLV0 to SNLV7 have a hysteresis characteristic such that the increase of the field strength of RF signal (decrease of the noise value) is more difficult to recover to suitable level than the decrease of the field strength of RF signal (increase of the noise value). Therefore, the mode change of a case in which the control of the microcomputer 7 moves to the mode of right side from the mode of left side in FIG. 7 by decreasing the field strength of RF signal becomes easier than a case in which the control of the microcomputer 7 returns to the mode of left side from the mode of right side in FIG. 7 by increasing the field strength of RF signal after that. Thus, after the field strength becomes weak once, the mode (mode 1 or mode 2) to improve the degradation of the picture quality is maintained until the field strength becomes strong enough.

In the above embodiment, it was explained about the embodiment that implements the progressive conversion processing or the frame rate conversion processing by detecting the film signal (video signal obtained from a source of a cinefilm). However, the video signal to which the detection processing, progressive conversion processing and frame rate conversion processing of the embodiment of the present invention are applied may be any kinds of video signals that are converted (telecine-converted) to make matching with the frame rate of the television signal by arranging the original image such as the cinema, animation or computer graphic, on the basis of the predetermined sequence.

Also, in the above embodiment, the embodiment of the present invention is applied to the television receiving apparatus, but the image display apparatus according to an embodiment of the present invention may be applied to a personal computer including a receiving function of the television broadcast, other than the television receiving apparatus. Furthermore, the video processing apparatus according to an embodiment of the present invention may be included into a recording/reproducing apparatus that receives the television broadcast and records and/or reproduces it (DVD recorder or HDD recorder or the like).

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus, comprising:
a telecine conversion signal detecting unit configured to detect whether or not an input video signal in an interlaced system is a telecine converted video signal;
an IP converting unit configured to convert the input video signal into a signal in a progressive system according to a detected result obtained by the telecine conversion signal detecting unit;
a frame rate converting unit having a frame rate conversion processing, wherein when the input video signal is detected as a telecine converted video signal, the frame rate converting unit is configured to convert a frame rate of the input video signal into a signal in a progressive system using the IP converting unit;
a noise level detecting unit configured to detect a noise level of the input video signal; and
a control unit configured to control a detection sensitivity of the telecine conversion signal detecting unit based on the noise level detected by the noise level detecting unit, such that as the detected noise level increases, the input video signal is detected as the telecine converted video less easily, wherein the control unit is configured to turn on the frame rate conversion processing when the detected noise level is less than a predetermined noise level, and wherein the control unit is configured to turn off the frame rate conversion processing when the detected noise level is greater than or equal to the predetermined noise level.

2. The apparatus according to claim 1, wherein
the noise level detecting unit is configured to detect a noise value; and wherein the noise level detecting unit is configured to detect a noise level based on the detected noise value.

3. The apparatus according to claim 1, wherein
the control unit is further configured to control the detection sensitivity of the telecine conversion signal detecting unit based on a selected control mode.

4. The apparatus according to claim 1, wherein
the control is further configured to control the detection sensitivity of the telecine conversion signal detecting unit based on a selected control mode.

5. The apparatus according to claim 1, wherein
the noise level detecting unit is configured to detect a noise value; and wherein the noise level detecting unit is configured to detect a noise level based on the detected noise value.

6. An apparatus, comprising:
a telecine conversion signal detecting unit configured to detect whether or not an input video signal in an interlaced system is a telecine converted video signal;
an IP converting unit configured to convert the input video signal into a signal in a progressive system according to a detected result obtained by the telecine conversion signal detecting unit;
a frame rate converting unit having a frame rate conversion processing, wherein when the input video signal is detected as a telecine converted video signal, the frame rate converting unit is configured to convert a frame rate of the input video signal into a signal in a progressive system using the IP converting unit;
a noise level detecting unit configured to detect a noise level of the input video signal; and
a control unit, wherein the control unit is configured to control a detection sensitivity of the telecine conversion signal detecting unit based on the noise level detected by the noise level detecting unit, such that as the detected noise level increases, the input video signal is detected as the telecine converted video signal less easily, wherein the control unit is configured to turn on the frame rate conversion processing when the detected noise level is less than a predetermined noise level, and wherein the control unit is configured to turn off the frame rate conversion processing when the detected noise level is greater than or equal to the predetermined noise level.

7. The apparatus according to claim 1, wherein
the noise level detecting unit is configured to detect a noise value; and wherein the noise level detecting unit is configured to detect a noise level based on the detected noise value.

8. An apparatus comprising:
a telecine conversion signal detecting circuit configured to detect whether or not an input video signal in an interlaced system is a telecine converted video signal;
an IP converting circuit configured to convert the input video signal into a signal in a progressive system according to a detected result obtained by the telecine conversion signal detecting circuit;
a frame rate converting circuit having a frame rate conversion processing, wherein when the input video signal is detected as a telecine converted video signal, the frame rate converting unit is configured to convert a frame rate of the input video signal into a signal in a progressive system using the IP converting unit;
a noise level detecting circuit configured to detect a noise level of the input video signal; and
a microcomputer configured to control a detection sensitivity of the telecine conversion signal detecting circuit noise level detected by the noise level detecting circuit, wherein the microcomputer is configured to turn on the frame rate conversion processing when the detected noise level is less than a predetermined noise level, and wherein the microcomputer is configured to turn off the frame rate conversion processing when the detected noise level is greater than or equal to the predetermined noise level.

9. The apparatus according to claim 8, wherein
the noise level detecting circuit is configured to detect a noise value; and wherein the noise level detecting circuit is configured to detect a noise level based on the detected noise value.

* * * * *